United States Patent
Kim et al.

(10) Patent No.: US 9,902,465 B2
(45) Date of Patent: Feb. 27, 2018

(54) MOVING APPARATUS AND METHOD OF OPERATING THE SAME

(75) Inventors: Sangwhee Kim, Seongnam-si (KR); Young-Il Shin, Daejeon (KR); Seong Ho Cho, Daejeon (KR); Eunjung Kim, Daejeon (KR); Youngjun Park, Daejeon (KR); Jinhyung Park, Daejeon (KR)

(73) Assignee: SAMSUNG HEAVY IND. CO., LTD., Seoul (KR)

( * ) Notice: Subject to any disclaimer, the term of this patent is extended or adjusted under 35 U.S.C. 154(b) by 1270 days.

(21) Appl. No.: 13/884,259

(22) PCT Filed: Aug. 3, 2011

(86) PCT No.: PCT/KR2011/005707
§ 371 (c)(1),
(2), (4) Date: Jul. 24, 2013

(87) PCT Pub. No.: WO2012/064009
PCT Pub. Date: May 18, 2012

(65) Prior Publication Data
US 2013/0292543 A1 Nov. 7, 2013

(30) Foreign Application Priority Data
Nov. 12, 2010 (KR) .......... 10-2010-0112772

(51) Int. Cl.
*B25J 9/00* (2006.01)
*B66C 21/04* (2006.01)
(Continued)

(52) U.S. Cl.
CPC .............. *B63B 9/00* (2013.01); *B25J 9/0078* (2013.01); *B66C 21/04* (2013.01); *F16M 13/022* (2013.01); *Y10S 901/01* (2013.01)

(58) Field of Classification Search
CPC .. B25J 5/02; B25J 9/0078; B63B 9/00; F16M 13/022; B66C 21/04; Y10S 901/01
(Continued)

(56) References Cited

U.S. PATENT DOCUMENTS 3,362,172 A * 1/1968 Rutter ................. B63B 9/00
405/3
5,445,094 A * 8/1995 Kai ...................... B63B 9/00
114/65 R
(Continued)

FOREIGN PATENT DOCUMENTS

CN 1097392 A 1/1995
CN 1296897 A 5/2001
(Continued)

OTHER PUBLICATIONS

Whee et al., KR20090124142A, (Machine Translation) Moving Aparatus for working Inside of Hull Block, Dec. 3, 2009.*
(Continued)

*Primary Examiner* — Muhammad Ijaz
(74) *Attorney, Agent, or Firm* — Knobbe Martens Olson & Bear LLP (57) ABSTRACT

Disclosed are an moving apparatus and a method of performing work to an interior of a hull block. The moving apparatus according to an exemplary embodiment of the present invention includes a guide rail configured to guide a working robot, a moving means driving unit configured to move the moving apparatus, and a storage battery configured to supply electricity to the moving means driving unit.

7 Claims, 12 Drawing Sheets

(51) Int. Cl.
  *B63B 9/00*  (2006.01)
  *F16M 13/02*  (2006.01)
(58) Field of Classification Search
  USPC .................................................. 248/626, 647
  See application file for complete search history.

(56) References Cited

U.S. PATENT DOCUMENTS

| | | | | |
|---|---|---|---|---|
| 5,585,707 | A * | 12/1996 | Thompson | B25J 5/00 318/568.1 |
| 6,095,054 | A * | 8/2000 | Kawano | B61B 13/04 104/130.07 |
| 6,845,819 | B2 * | 1/2005 | Barrett | E21B 17/028 166/250.01 |
| 6,887,014 | B2 * | 5/2005 | Holland | B08B 9/049 104/138.2 |
| 6,931,304 | B1 * | 8/2005 | Miller | G11B 15/6835 369/30.34 |
| 7,073,979 | B2 * | 7/2006 | McGrew | E03F 3/06 166/298 |
| 7,348,747 | B1 * | 3/2008 | Theobold | B25J 5/005 318/568.11 |
| 7,744,331 | B2 * | 6/2010 | Ellis | B62B 5/0026 180/8.2 |
| 7,996,109 | B2 * | 8/2011 | Zini | G05B 19/41895 700/245 |
| 9,126,331 | B2 * | 9/2015 | Kim | B63B 21/00 |
| 9,251,921 | B2 * | 2/2016 | Dean | G21C 17/013 |
| 9,393,686 | B1 * | 7/2016 | Bradski | B25J 9/163 |
| 2004/0093650 | A1 * | 5/2004 | Martins | B25J 5/007 180/167 |
| 2004/0107862 | A1 * | 6/2004 | Suh | B61B 3/02 104/91 |
| 2005/0083011 | A1 * | 4/2005 | Yang | A47L 9/00 320/107 |
| 2006/0048800 | A1 * | 3/2006 | Rast | A47L 1/02 134/56 R |
| 2006/0290779 | A1 * | 12/2006 | Reverte | E03F 7/10 348/84 |
| 2007/0226949 | A1 * | 10/2007 | Hahm | A47L 9/009 15/340.1 |
| 2008/0087656 | A1 * | 4/2008 | Jeong | B23K 37/0443 219/158 |
| 2009/0000409 | A1 * | 1/2009 | Hammerer | B23Q 5/385 74/89.17 |
| 2009/0066100 | A1 * | 3/2009 | Bosscher | B25J 17/0266 294/86.4 |
| 2010/0026239 | A1 * | 2/2010 | Li | H02J 7/0044 320/109 |
| 2011/0169938 | A1 * | 7/2011 | Webster | F22B 37/002 348/82 |
| 2012/0043162 | A1 * | 2/2012 | Kim | B25J 9/0078 182/142 |
| 2012/0118208 | A1 * | 5/2012 | Kim | B66C 21/00 108/20 |
| 2013/0142297 | A1 * | 6/2013 | Dean | G21C 17/013 376/248 |
| 2013/0206956 | A1 * | 8/2013 | Kim | B63B 21/00 248/647 |
| 2013/0292543 | A1 * | 11/2013 | Kim | B66C 21/04 248/646 |
| 2014/0139659 | A1 * | 5/2014 | Lim | G01N 21/9515 348/92 |
| 2015/0122963 | A1 * | 5/2015 | Mochizuki | F16C 29/004 248/323 |
| 2015/0273696 | A1 * | 10/2015 | Nam | B25J 19/005 700/259 |
| 2015/0375390 | A1 * | 12/2015 | Becroft | B25J 9/0018 427/427.2 |
| 2016/0248371 | A1 * | 8/2016 | Eo | H02S 20/30 |
| 2016/0368134 | A1 * | 12/2016 | Hafenrichter | F01D 5/005 |
| 2017/0106924 | A1 * | 4/2017 | Hafenrichter | B62D 57/032 |
| 2017/0217695 | A1 * | 8/2017 | Puveendiran | B65G 65/34 |

FOREIGN PATENT DOCUMENTS

| | | |
|---|---|---|
| CN | 101412008 A | 4/2009 |
| JP | 02-030476 A | 1/1990 |
| JP | 03-245180 A | 10/1991 |
| JP | 04-210392 A | 7/1992 |
| JP | 08-119583 A | 5/1996 |
| JP | 09-500337 A | 1/1997 |
| JP | 10-306578 A | 11/1998 |
| JP | 2007-175196 A | 7/2007 |
| KR | 10-2009-0124142 A | 12/2009 |
| KR | 10-2010-0111183 A | 10/2010 |
| KR | 10-2010-0111184 A | 10/2010 |

OTHER PUBLICATIONS

Merriam Webster, Definition for plug, Feb. 20, 2010.*
Search Report dated Feb. 16, 2015, which was attached to the Office Action dated Mar. 2, 2015, of corresponding Chinese Patent Application No. 2011800542461, 2 pages.
International Search Report dated Dec. 27, 2011 of PCT/KR2011/005707 which is the parent application—4 pages.

* cited by examiner

MOVING APPARATUS AND METHOD OF OPERATING THE SAME

TECHNICAL FIELD

The present invention relates to a moving apparatus and a method of operating the moving apparatus.

BACKGROUND ART

Because a ship is very large and more complicated in scale than a general building, the ship is manufactured through a process of fabricating block units by using a number of members, tools and materials and assembling the block units. Various automation equipment are necessary to perform welding, painting and inspection operations in order to fabricate a hull block, and complicated structures, which are installed in the hull block to reinforce structural rigidity of a hull, frequently interrupt the flow of work of the automation equipment. An autonomous moving apparatus, which freely moves up and down and left and right by using a wire so as to avoid obstacles, has been developed.

As electric power source cables and various communication cables are connected in the autonomous moving apparatus in order to drive and control the apparatus, the cables interfere with the work of a working robot mounted on the moving apparatus as well as movement of the moving apparatus. In addition, a problem may occur in which painted surfaces and the cables itself are damaged due to the cables and the painted surfaces coming into contact with each other.

DISCLOSURE

Technical Problem

The present invention has been made in an effort to provide an moving apparatus and a method of operating the same, which is freely movable and is not limited to a substantial work space.

Technical Solution

An exemplary embodiment of the present invention provides a moving apparatus including: a guide rail configured to guide a working robot; a moving means driving unit configured to move the moving apparatus; and a storage battery configured to supply electricity to the moving means driving unit.

The moving apparatus may be coupled to the working robot, and further includes a plug module configured to be supplied with electricity from the working robot and to supply electricity to the storage battery in a state of being coupled to the working robot, and the working robot may be connected to an electric wire and supplied with electricity through the electric wire from the outside.

The plug module may supply electricity from the working robot to the moving means driving unit in a state of being coupled to the working robot, and the storage battery may stop a supply of electricity to the moving means driving unit.

The storage battery may be remotely turned on/off.

The moving apparatus may include a main body including the moving means driving unit and the plug module; and a rotating unit including the storage battery therein and configured to be rotatable with respect to the main body.

The main body may have upper and lower surfaces which are flat and in parallel to each other, the guide rail may be provided at all of the upper and lower surfaces, and the plug modules may be provided at the upper and lower surfaces of the main body one by one, respectively.

The main body further may include a rotating unit driving unit which is coupled to the rotating unit to rotate the rotating unit.

The rotating unit driving unit may include a rotating unit driving motor, and a decelerator configured to transmit torque of the rotating unit driving motor to the rotating unit.

The moving apparatus may include a control unit configured to control the moving means driving unit, the rotating unit driving unit, and the plug module in accordance with an external wireless signal.

The moving apparatus may further include a docking unit coupled to the main body and configured to dock the moving apparatus to another moving apparatus.

The moving means driving unit may include a winch configured to wind a wire, and a winch driving motor configured to rotate the winch, in which one end of the wire is fixed to one side of a workspace.

The wire may be formed in plural.

The workspace may be inside or outside of a hull block.

Another exemplary embodiment of the present invention provides a method of operating a moving apparatus, including: initializing by installing a moving apparatus having a storage battery in a workspace; moving the moving apparatus to a working robot by using electricity of the storage battery; mounting the working robot on the moving apparatus; and performing work in the workspace by moving the moving apparatus on which the working robot is mounted.

The method of operating an moving apparatus may further includes charging the storage battery through the working robot mounted on the moving apparatus.

The performing of the work in the workspace may be performed by directly using electricity supplied through the working robot without allowing electricity to pass through the storage battery.

The performing of the work in the workspace may include positioning the working robot on an upper surface of the moving apparatus; performing work to an upper side of the workspace by using the working robot positioned on the upper surface of the moving apparatus while moving the moving apparatus; moving the working robot from the upper surface of the moving apparatus to a lower surface by using electricity of the storage battery; and performing work to a lower side of the workspace by using the working robot positioned on the lower surface of the moving apparatus while moving the moving apparatus.

The performing of the work to the upper side of the workspace and the performing of the work to the lower side of the workspace may be performed by using electricity supplied through the working robot.

The initializing may include recognizing an environment by moving the moving apparatus in the workspace, and in the recognizing of the environment, the moving apparatus may be moved by using electricity of the storage battery.

The moving apparatus may be movable through a plurality of wires connected to one side of the workspace.

The workspace may be inside or outside of a hull block.

Advantageous Effects

According to the exemplary embodiment of the present invention, the moving apparatus may be freely moved in the workspace, and the substantial workspace may be enlarged.

MODE FOR INVENTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

First, a moving apparatus according to an exemplary embodiment of the present invention will be described in detail with reference to FIGS. 1 to 5.

Figure 1:
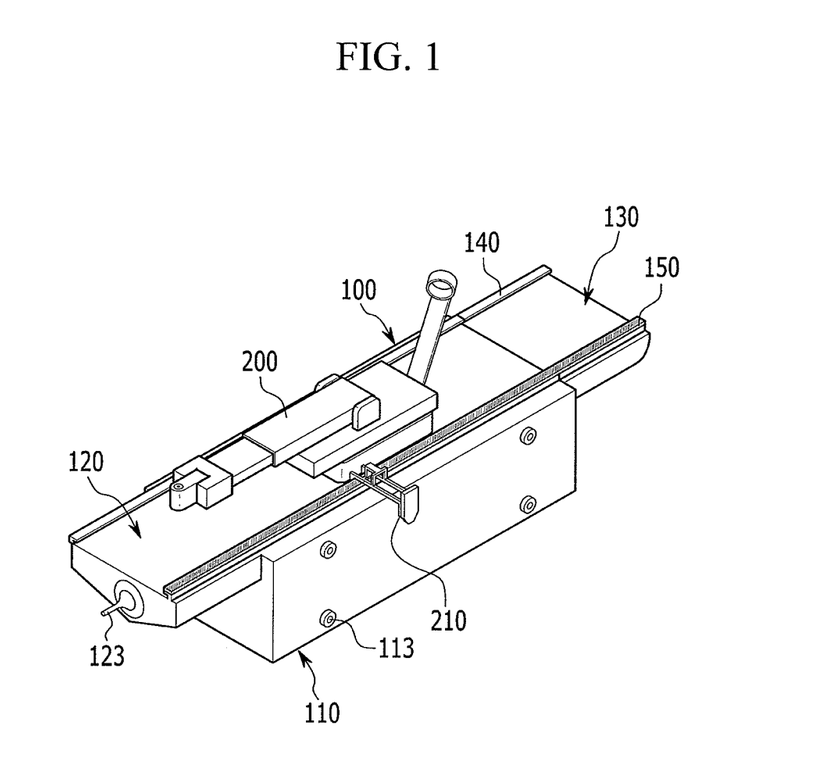
FIGS. 1 and 2 are perspective views illustrating a moving apparatus and a working robot according to an exemplary embodiment of the present invention.
Figure 2:
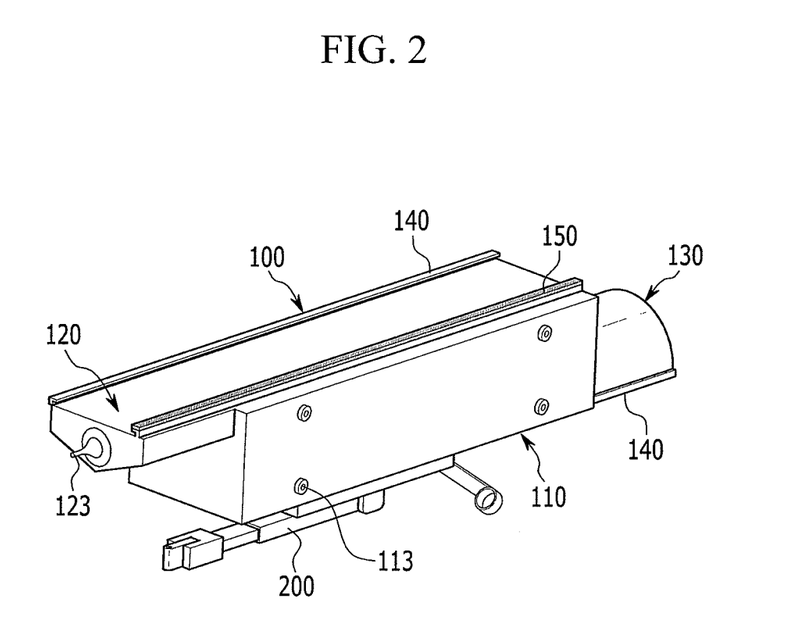
Figure 3:
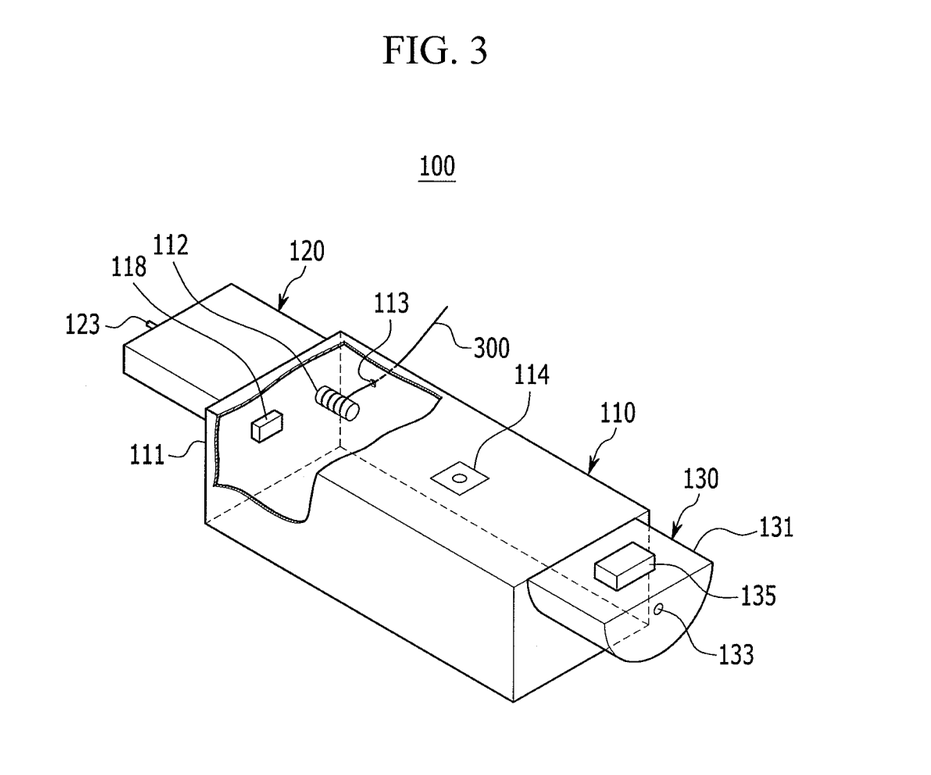
FIG. 3 is a perspective view schematically illustrating an internal structure of a part of the moving apparatus.
Figure 4:
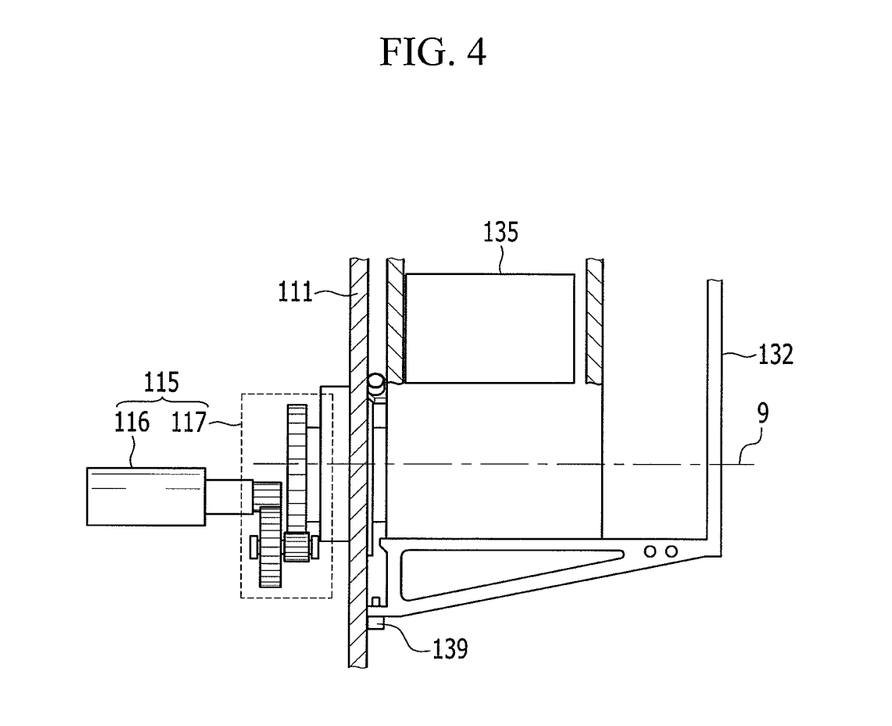
FIG. 4 is a partial cross-sectional view schematically illustrating internal structures of a main body and a rotating unit of the moving apparatus.
Figure 5:
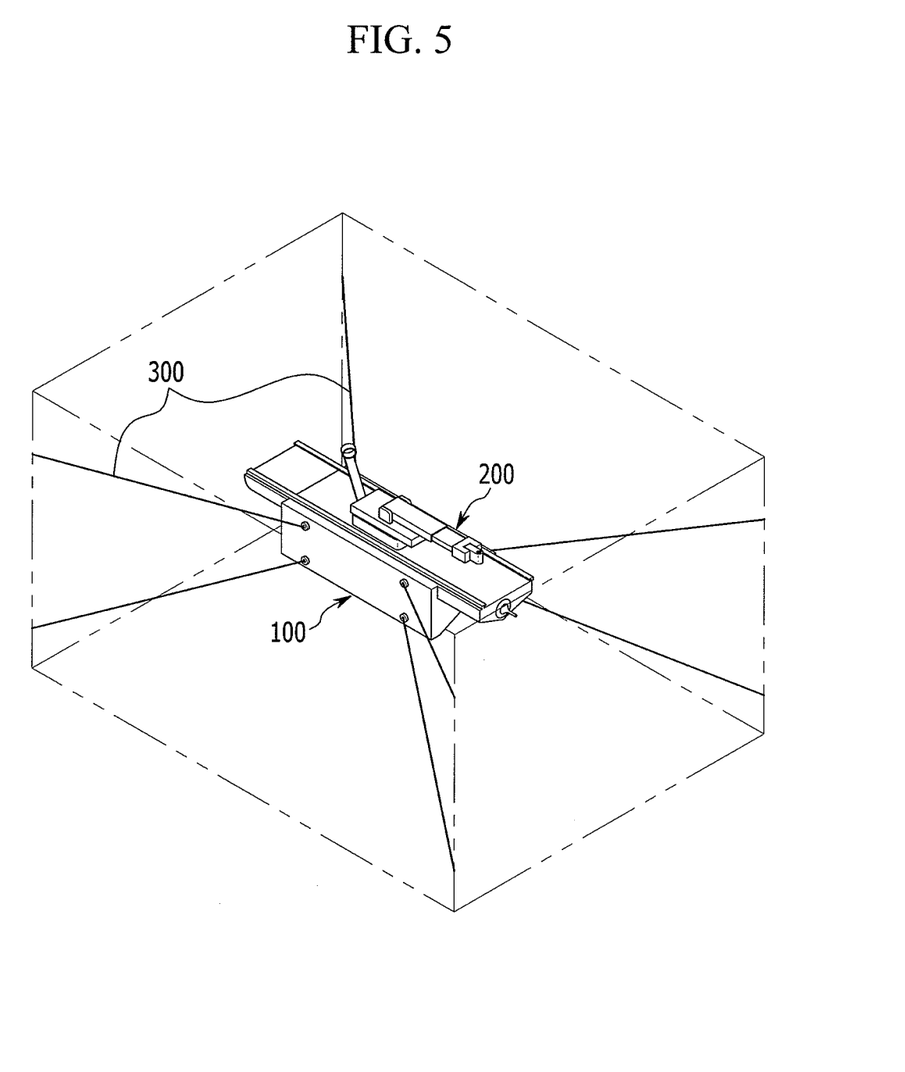
FIG. 5 is a view schematically illustrating the moving apparatus and the working robot installed in a hull block.

FIGS. 1 and 2 are perspective views illustrating a moving apparatus and a working robot according to an exemplary embodiment of the present invention, FIG. 3 is a perspective view schematically illustrating an internal structure of a part of the moving apparatus, FIG. 4 is a partial cross-sectional view schematically illustrating internal structures of a main body and a rotating unit of the moving apparatus, and FIG. 5 is a view schematically illustrating the moving apparatus and the working robot installed in a hull block.

As illustrated in FIGS. 1 and 2, a moving apparatus 100 according to the present exemplary embodiment refers to an apparatus which has a working robot 200 mounted thereon and moves to a designated position in a workspace so as to allow the working robot 200 to perform work at the designated position.

Here, the workspace of the moving apparatus 100, for example, may be inside or outside a hull block. However, the workspace of the moving apparatus is not limited thereto. In the present exemplary embodiment, an example in which the moving apparatus 100 performs work inside the hull block is illustratively described.

Meanwhile, the work, which is performed by the working robot, is a work that needs to be performed in the workspace, and includes all various types of work that may be performed by a robot. In the present exemplary embodiment, a process in which the working robot performs work of painting an interior of the hull block is illustratively described.

The moving apparatus 100 of the present exemplary embodiment includes a main body 110, a docking unit 120, and a rotating unit 130.

The main body 110 has an appearance of an approximately rectangular column shape, and the docking unit 120 and the rotating unit 130 are coupled to both sides of the main body 110.

An upper surface of the docking unit 120 is flat and connected to an upper surface of the main body 110 on the same surface.

An upper surface of the rotating unit 130 is also flat and connected to the upper surface of the main body 110 on the same surface, as illustrated in FIG. 1.

However, as illustrated in FIGS. 1 and 2, the rotating unit 130 may be rotated about a central axis in a longitudinal direction of the main body 110, and the upper surface of the rotating unit 130 after being rotated by 180° is connected to a lower surface of the main body 110 on the same surface.

However, appearances of the main body 110, the docking unit 120, and the rotating unit 130 may be different from those illustrated in FIGS. 1 and 2.

A pair of guide rails 140, which face each other, is formed on the upper and lower surfaces of the main body 110 and the upper surfaces of the docking unit 120 and the rotating unit 130, and an auxiliary fixing member 150 is provided on one guide rail 140.

The working robot 200 is moved on the upper surface or the lower surface of the moving apparatus 100 along the guide rail 140, and fixed to a particular position of the upper surface or the lower surface of the moving apparatus 100 by a fixing member 210, as necessary.

The working robot 200 is supplied with electricity from the outside through an electric wire (not illustrated) connected to the working robot 200, and operated by an external wired control using a communication cable (not illustrated) or a wireless control.

The auxiliary fixing member 150 is provided to assist the fixing member 210 so that the position of the fixing member 210 is not changed when the fixing member 210 is fixed on the guide rail 140, and is formed of bristles or the like.

Referring to FIGS. 3 to 5, the main body 110 includes a housing 111, a moving means driving unit 112, a plug module 114, a rotating unit driving unit 115, and a control unit 118.

The moving means driving unit 112 is provided to drive a moving means which moves the moving apparatus 100, and referring to FIG. 5, the moving means of the moving apparatus 100 according to the present exemplary embodiment is a plurality of wires 300.

Referring to FIG. 3, the moving means driving unit 112 is fixed to the housing 111 or a frame (not illustrated) in the housing 111, and may include a winch on which a wire 300 is wound and a motor which rotates the winch.

As illustrated in FIG. 5, the other end of the wire 300 connected to the moving means driving unit 112 is fixed to the hull block 1 through a through-hole 113 formed in the housing 111.

The number of wires 300 installed in the hull block needs to be equal to or more than six in order for the moving apparatus 100 to move up and down and left and right in the hull block, and the number of moving means driving units 112 and the number of through-holes 113 are the same as the number of wires 300.

Particularly, the number of wires 300 may be equal to or more than eight in order to allow the moving apparatus 100 to move to every position inside the hull block 1 while being maintained to be in parallel to a bottom of the hull block 1.

A position of the through-hole 113 may vary in accordance with the number of through-holes 113, a size of the hull block 1, or a size of the moving apparatus 100, and for example, when an appearance of the main body 110 of the moving apparatus 100 is cuboid and the number of through-holes 113 is six, the through-holes 113 may be formed at six surfaces of the main body 110, respectively.

As illustrated in the drawing, when the number of through-holes 113 is eight, four through-holes 113 may be formed at two side surfaces in a longitudinal direction among four side surfaces of the main body 110, respectively, and the four through-holes 113 may be formed in the vicinity of four corners of the side surface one by one, respectively.

A position of the moving apparatus 100 may be controlled by winding or unwinding each wire 300 by using the moving means driving unit 112.

Each moving means driving unit 112 may be positioned at a position adjacent to the corresponding through-hole 113.

Referring to FIG. 4, the rotating unit driving unit 115 is fixed to the housing 111 or a frame in the housing 111, and includes a motor 116 and a decelerator 117 connected to the motor 116.

The decelerator 117 includes a plurality of gears of which axes are in parallel to each other and engaged with each other, and coupled to the rotating unit 130 to transmit torque of the motor 116 to the rotating unit 130 in order to rotate the rotating unit 130.

Referring to FIG. 3, the plug modules 114 are provided in the vicinity of a center portion of the upper and lower surfaces of the main body 110 one by one, and coupled to a socket module (not illustrated) of the working robot 200 to serve to receive electricity from the working robot 200 and supply electricity to the moving apparatus 100.

First, the plug module 114 coupled to the working robot 200 is moved on the upper surface or the lower surface of the moving apparatus 100 together with the working robot 200. The above-mentioned operation may be implemented by winding an electric wire of the plug module 114 around a member such as a spring which has restoring force.

When the working robot 200 is moved away from an initial position of the plug module 114, the electric wire is unwound, and when the working robot 200 is moved again to be close to the initial position of the plug module 114, the electric wire is wound again by the restoring force.

When the working robot 200 mounted on the rotating unit 130 is rotated together with the rotating unit 130, the plug module 114 is separated from the working robot 200, and when the working robot 200, which completes the operation, is positioned on an opposite surface of the moving apparatus 100, the plug module 114 positioned on the opposite surface is coupled to the working robot 200.

The control unit 118 may be installed inside or outside the housing 111, and driving devices in the main body 110, such as the moving means driving unit 112, the rotating unit driving unit 115, and the plug module 114, are controlled by an external wireless signal.

Referring to FIGS. 1 and 3, one side surface of the docking unit 120 is coupled to the main body 110, and a docking member 123 is formed at the other side surface. The docking member 123 illustrated in FIG. 1 is a male protruding portion, but may be a female recess portion or groove which may accommodate a protruding portion.

Referring to FIGS. 3 and 4, the rotating unit 130 includes a housing 131, a frame 132, a storage battery 135, a docking member 133, and a plurality of auxiliary rotating members 139.

The frame 132 is positioned in the housing 131 illustrated in FIG. 3, and coupled to the decelerator 117 of the main body 110 to be able to be rotated about an axis 9.

The storage battery 135 is fixed to the frame 132, and connected to the control unit 118 of the main body 110 and each driving device, that is, the moving means driving unit 112, the plug module 114, and the rotating unit driving unit 115 to supply electricity to the aforementioned components.

The storage battery 135 may be charged by being supplied with external electricity through the working robot 200 and the plug module 114 in a state in which the plug module 114 and the working robot 200 are coupled to each other.

In this state, the control unit 118 and each of the driving devices 112, 114, and 115 may be also driven by being supplied with external electricity through the working robot 200 and the plug module 114, and at this time, the storage battery 135 cuts off the supply of electricity to the control unit 118 and each of the driving devices 112, 114, and 115.

When the moving apparatus 100 is in a standby state without being moved, a power source may be remotely turned on/off to prevent the storage battery 135 from being discharged.

The storage battery 135 may not be installed at the rotating unit 130, but may be installed at the main body 110 or the docking unit 120, but it is advantageous for mounting, attaching and detaching the storage battery 135, when the storage battery 135 is installed at the rotating unit 130.

The docking member 133 is provided on an outer side surface of the rotating unit 130, and may be a female recess portion or groove which may accommodate the docking member 123 having a protruding portion shape illustrated in FIG. 1. When the docking member 123 of the docking unit 120 is female, the docking member 133 of the rotating unit 130 may be male.

While the docking means suggested in the present exemplary embodiment includes a pair of protruding portion and recess portion, may be made in various types different from the aforementioned type. For example, various types such as a type in which one docking member is locked to the other docking member by a locking iron or suspended by the other docking member by making the one docking member be in a hook shape may be used.

The auxiliary rotating member 139 is coupled to the frame 132 to be rotatable, and may be in contact with the main body 110.

When the rotating unit 130 is rotated, the auxiliary rotating member 139 maintains facing surfaces of the rotating unit 130 and the main body 110 to be spaced apart from each other at a predetermined distance, and prevents the facing surfaces from being in contact with each other, and as a result a problem of abrasion which occurs when the facing surfaces come into contact with each other, and an incomplete rotation may be prevented.

As such, because the moving apparatus 100 according to the present exemplary embodiment is driven by using the storage battery 135 mounted in the moving apparatus 100, an electric wire, which disturbs movement of the moving apparatus 100, is not necessary at all, a space in which the moving apparatus 100 is movable is very enlarged, and the moving apparatus 100 may be quickly moved. In addition, a painting defect of the hull block 1 and damage to an electric wire due to the electric wire and the painted surface coming into contact with each other may be prevented. In addition, when the moving apparatus 100 is controlled in a wireless manner, because the communication cable is not necessary, the above-mentioned effect may be further improved.

Then, an operation of the moving apparatus according to the present exemplary embodiment will be described in detail with reference to FIGS. 6 to 18 together with FIGS. 1 to 5.

Figure 12:
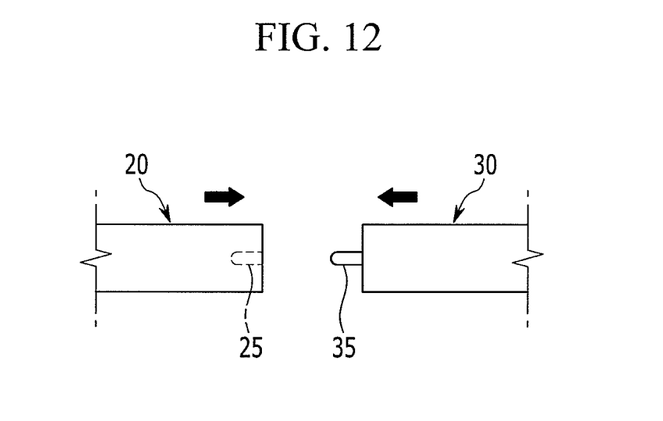
FIG. 12 is a front view for schematically explaining a docking process between the moving apparatuses.
Figure 13:
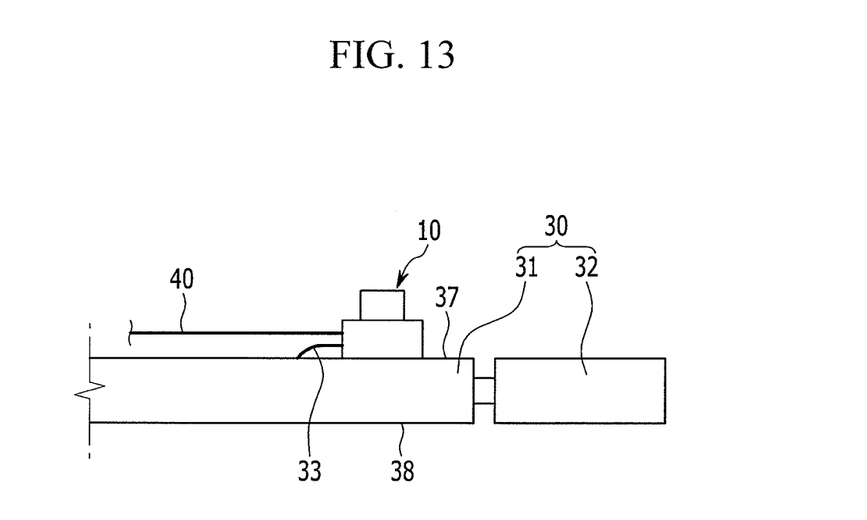
FIG. 13 is a front view schematically illustrating a state in which a plug module at an upper surface of the moving apparatus and the working robot are coupled to each other.
Figure 14:
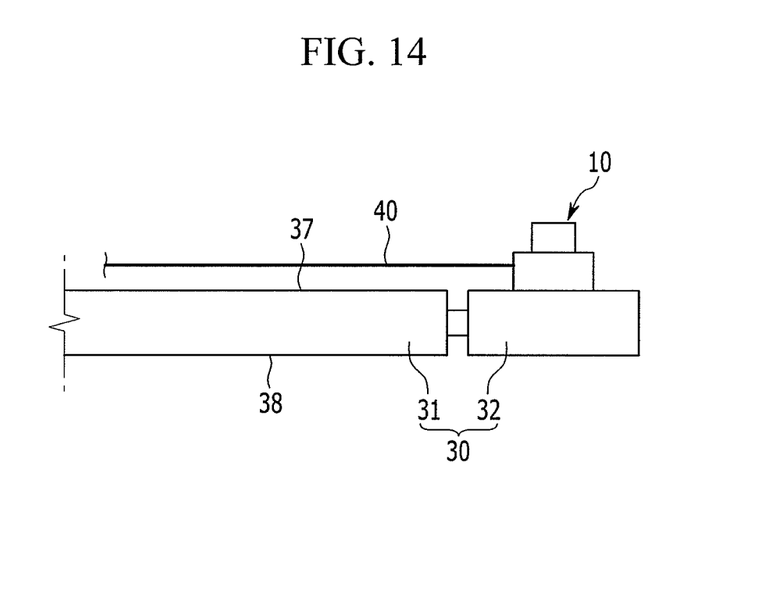
FIG. 14 is a front view illustrating a state in which the working robot is mounted on the rotating unit of the moving apparatus.
Figure 15:
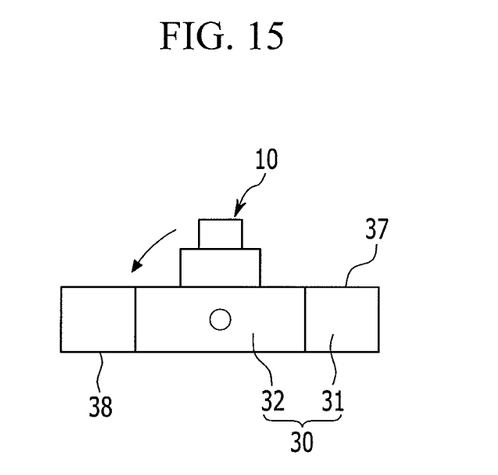
FIGS. 15 to 17 are schematic side views for explaining a rotation of the rotating unit of the moving apparatus.
Figure 16:
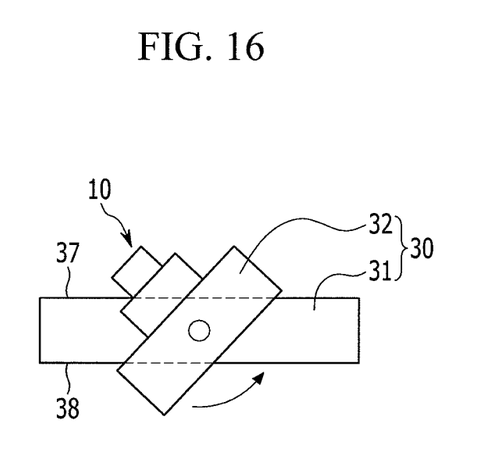
Figure 17:
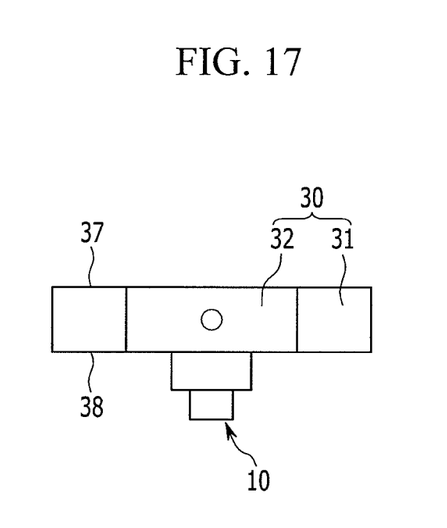
Figure 18:
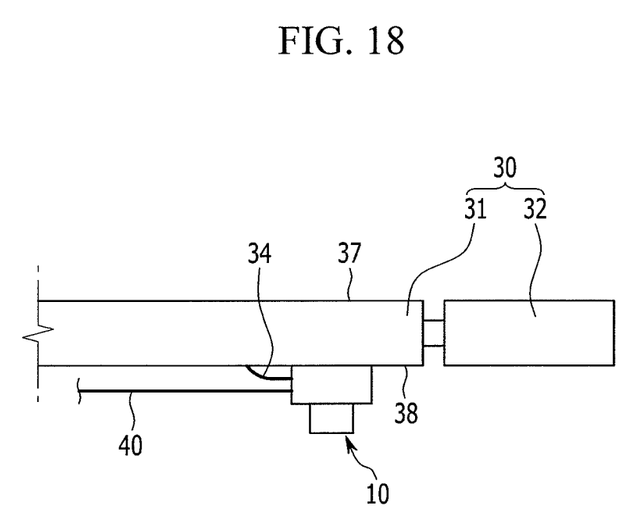
FIG. 18 is a front view schematically illustrating a state in which a plug module at a lower surface of the moving apparatus and the working robot are coupled to each other.

FIGS. 6 to 11 are schematic views for sequentially explaining an operation of the moving apparatus according to the present exemplary embodiment. FIG. 12 is a front view for schematically explaining a docking process between the moving apparatuses. FIG. 13 is a front view schematically illustrating a state in which a plug module at an upper surface of the moving apparatus and the working robot are coupled to each other. FIG. 14 is a front view illustrating a state in which the working robot is mounted on the rotating unit of the moving apparatus. FIGS. 15 to 17 are schematical side views for explaining a rotation of the rotating unit of the moving apparatus. FIG. 18 is a front view schematically illustrating a state in which a plug module at a lower surface of the moving apparatus and the working robot are coupled to each other.

Figure 6:
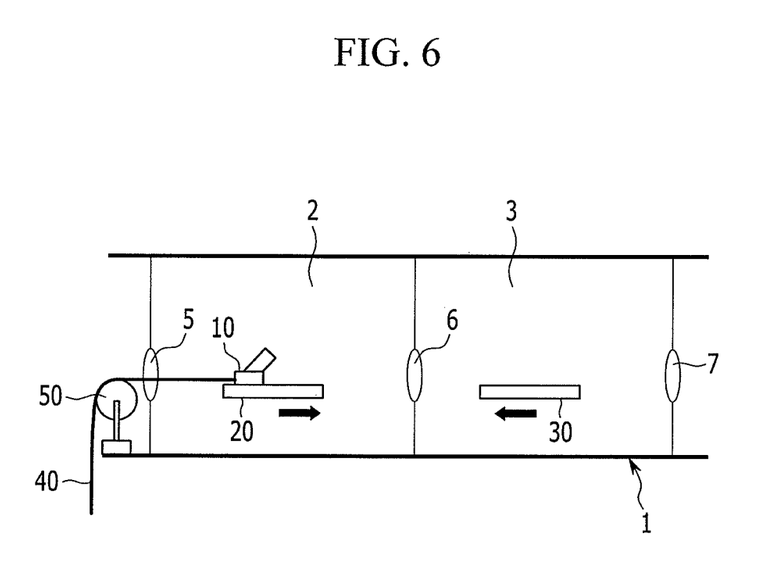
FIGS. 6 to 11 are schematic views for sequentially explaining an operation of the moving apparatus according to the present exemplary embodiment.

The hull block 1 is partitioned into a plurality of cells 2 and 3, for example, an outer cell 2 and an inner cell 3, and one of the moving apparatuses 20 and 30 is installed in one of the cells 2 and 3.

Holes 5, 6, and 7, through which the working robot 10 and the moving apparatuses 20 and 30 may pass, are formed between the hull block 1 and the outside, and between the cells 2 and 3.

In order to recognize an environment such as obstacles in the cells 2 and 3 and a position of an end of the wire 300 (see FIG. 5) after the moving apparatuses 20 and 30 are installed in the cells 2 and 3, the moving apparatuses 20 and 30 are moved inside the cells 2 and 3, electricity charged in the storage battery 135 illustrated in FIG. 4 is used in this initialization step.

When the environment recognition is completed, the working robot 10 connected to the electric wire 40 enters the outer cell 2 through the hole 5, and is mounted on the moving apparatus 20. To this end, the moving apparatus 20 needs to move to the hole 5, and at this time, electricity charged in the storage battery of the moving apparatus 20 is also used.

In FIGS. 6 to 11, reference numeral 50 refers to a pulley for smoothly moving the electric wire 40.

Work inside two cells 2 and 3 are performed by using the working robot 10, and for example, the work is performed in order of an upper side of the inner cell 3, a lower side of the inner cell 3, an upper side of the outer cell 2, and a lower side of the outer cell 2.

Referring to FIG. 6, in order to perform the work with respect to the inner cell 3, the moving apparatus 20 in the outer cell 2 on which the working robot 10 is mounted is moved to the hole 6 between two cells 2 and 3, and the moving apparatus 30 in the inner cell 3 is also moved to the hole 6. In this process, the moving apparatuses 20 and 30 are driven by electricity charged in the storage battery. However, the moving apparatus 20 in the outer cell 2 may be driven by being supplied with electricity from the working robot 10, and to this end, a plug module (not illustrated) of the moving apparatus 20 needs to be coupled to the working robot 10.

Figure 7:
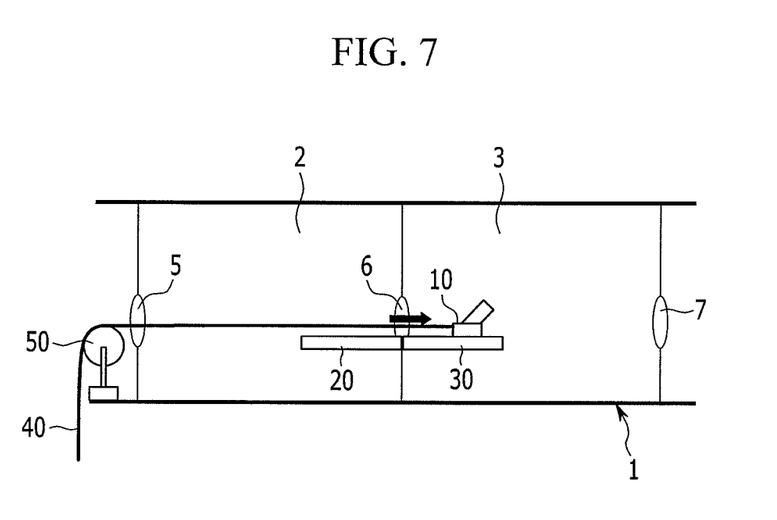

Referring to FIG. 7, the moving apparatuses 20 and 30 in two cells 2 and 3 are docked through the hole 6. At this time, as illustrated in FIG. 12, as the female docking member 25 provided at the moving apparatus 20 in the outer cell 2 accommodates the male docking member 35 provided at the moving apparatus 30 in the inner cell 3, and the docking between two moving apparatuses 20 and 30 is possible. When the docking is completed, the working robot 10 is moved to the moving apparatus 30 in the inner cell 3 to be mounted on the moving apparatus 30.

Thereafter, as illustrated in FIG. 13, the working robot 10 and the plug module 33 positioned on the upper surface 37 of the main body 31 of the moving apparatus 30 in the inner cell 3 are coupled to each other.

Then, a supply of electricity from the working robot 10 to the moving apparatus 30 starts, and at the same time, the storage battery of the moving apparatus 30 begins to be charged. Reference numeral 33 of FIG. 13 shows only an electric wire of the plug module.

As described above, when the plug module of the moving apparatus 20 in the outer cell 2 and the working robot 10 are coupled to each other, the working robot 10 needs to be released from the plug module before performing the docking, and the charging of the storage battery of the moving apparatus 20 in the outer cell is stopped.

Figure 8:
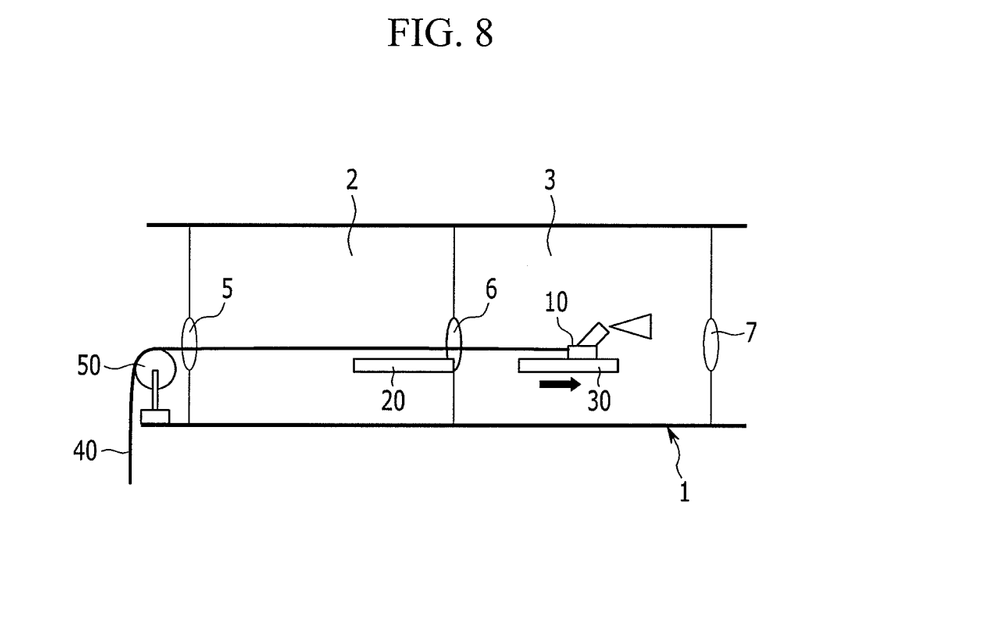

Referring to FIG. 8, interior work is performed by using the moving apparatus 30, on which the working robot 10 is mounted, in the inner cell 3 while moving the working robot 10 to a desired position inside the cell 3. At this time, the moving apparatus 30 may be driven by electricity supplied from the working robot 10.

Figure 9:
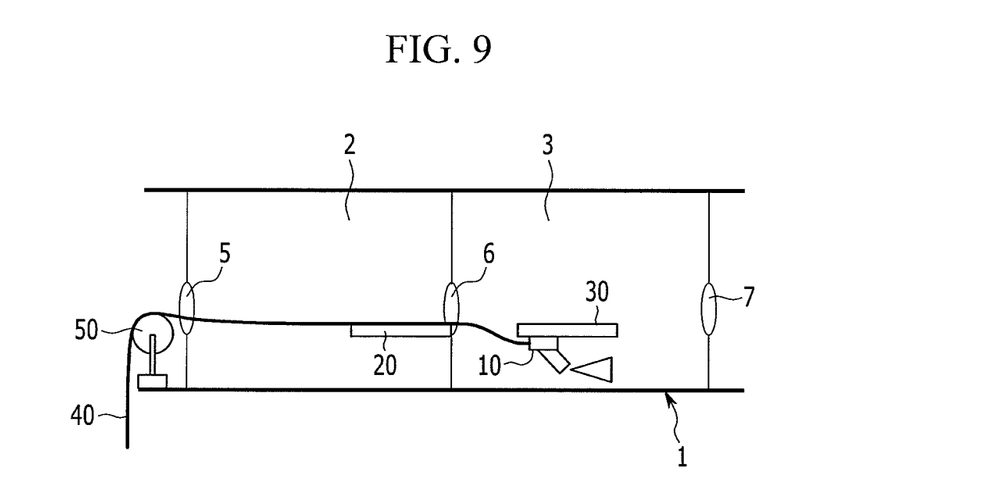

Referring to FIG. 9, the work to a lower side of the inner cell 3 is performed by moving the working robot 10 positioned on the upper surface of the moving apparatus 30 to the lower surface of the moving apparatus 30.

Specifically, first, as illustrated in FIG. 14, after the working robot 10 is released from the plug module 33 positioned on the upper surface 37 of the main body 31 of the moving apparatus 30, and is moved to the rotating unit 32 of the moving apparatus 30.

Referring to FIGS. 15 to 17, the rotating unit 32 on which the working robot 10 is mounted is rotated by 180° in order for the working robot 10 to be reversed upside down, and in this process, electricity stored in the storage battery in the moving apparatus 30 is used.

Referring to FIG. 18, the working robot 10 is moved to the lower surface 38 of the main body 31 of the moving apparatus 30, and coupled to the plug module 34 on the lower surface 38 of the main body 31 to supply electricity to the moving apparatus 30.

Finally, the work to a lower side of the inner cell 3 is performed while moving the moving apparatus 30.

When the work to the lower side of the inner cell 3 is completed, the working robot 10 is released from the plug module 34 positioned on the lower surface 38 of the main body 31 of the moving apparatus 30, and is moved again to the rotating unit 32 of the moving apparatus 30.

The working robot 10 stands upright by rotating the rotating unit 32 on which the working robot 10 is mounted, and the working robot 10 is moved to the upper surface 37 of the main body 31.

Next, the moving apparatus 30 in the inner cell 3 is moved to the hole 6 to dock with the moving apparatus 20 in the outer cell 2, and in the movement process, electricity stored in the storage battery of the moving apparatus 30 is used.

Of course, in this process, electricity may be supplied from the working robot 10 by coupling again the working robot 10 to the plug module 33 positioned on the upper surface 37 of the main body 31 of the moving apparatus 30, but because this movement is performed within a short distance, electricity of the storage battery may be used.

Figure 10:
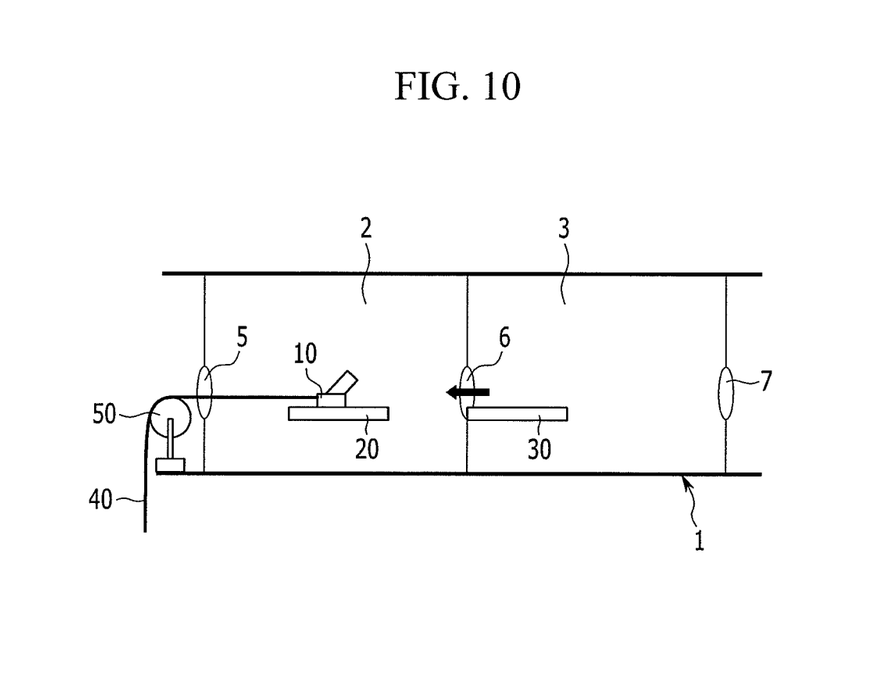

Referring to FIG. 10, after docking is completed, the working robot 10 is moved to be mounted on the moving apparatus 20 in the outer cell 2.

Next, the work to the upper side of the cell 2 is performed by moving the moving apparatus 20, on which the working robot 10 is mounted, inside the cell 2 while supplying electricity to the moving apparatus 20 by coupling the working robot to the plug module (not illustrated) on the upper surface of the moving apparatus 20.

Figure 11:
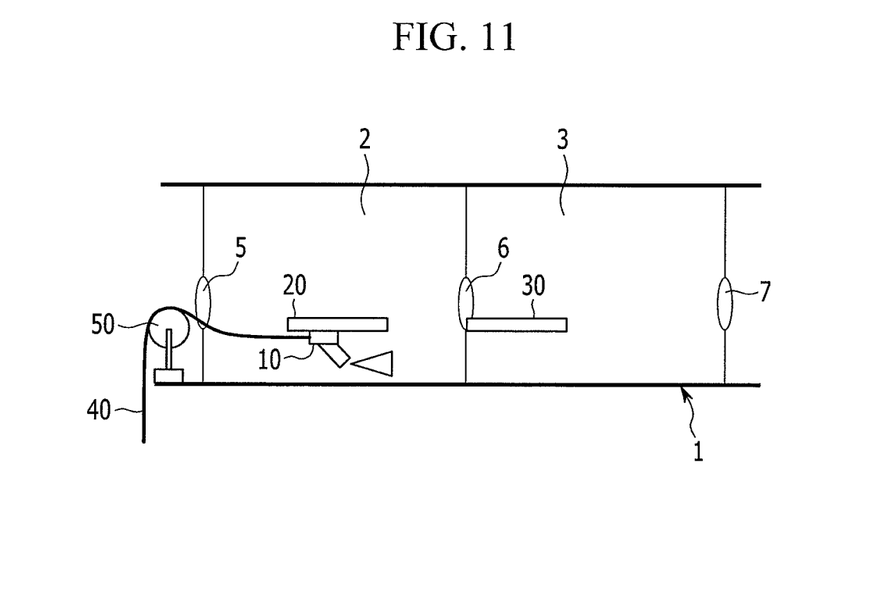

Referring to FIG. 11, the working robot 10 which completes the work to the upper side of the outer cell 2 is moved to the lower surface of the moving apparatus 20, and the work to the lower side of the outer cell 2 is performed.

Because the work process is nearly the same as the work process for the inner cell 3 which is described above, a detailed description thereof will be omitted.

The aforementioned various operations are performed by an external control, and the control is performed by the control unit 118 as illustrated in FIG. 3.

As such, because the moving apparatuses 20 and 30 according to the present exemplary embodiment are driven by using storage battery mounted therein without using an electric wire connected to the outside, a space in which the moving apparatus is movable may be very enlarged, and the moving apparatus may be quickly moved.

In addition, a painting defect of the hull block 1 and damage to an electric wire due to the electric wire and the painted surface coming into contact with each other may be prevented.

In addition, when the moving apparatuses 20 and 30 are controlled in a wireless manner, because the communication cable is not necessary, the above-mentioned effect may be further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The moving apparatus according to the exemplary embodiment of the present invention is an apparatus which has a working robot mounted thereon, and is moved to a designated position in a workspace to allow the working robot to perform work at the designated position. The moving apparatus according to the exemplary embodiment of the present invention may be used to paint an interior of a hull block, but is not limited thereto. According to the exemplary embodiment of the present invention, the moving apparatus may be freely moved in the workspace, and the substantial workspace may be enlarged.

What is claimed is:

1. A moving apparatus comprising:
   a working robot connected to an electric wire and configured to receive electricity through the electric wire from outside the working robot;
   a main body including: a guide rail configured to guide the working robot, a moving means driving unit configured to move the moving apparatus, and a plug module configured to be coupled to the working robot;
   a rotating unit including a storage battery therein and configured to rotate with respect to the main body, and wherein the storage battery is configured to supply electricity to the moving means driving unit; and
   the plug module configured to receive electricity from the working robot and to supply electricity to the storage battery and the moving means driving unit when the plug module is coupled to the working robot.

2. The moving apparatus of claim 1, wherein:
   the main body has upper and lower surfaces which are flat and in parallel to each other, and the guide rail is provided on the upper surface of the main body.

3. The moving apparatus of claim 2, wherein:
   the plug module is provided at the upper surface of the main body.

4. The moving apparatus of claim 3, wherein the main body further includes a rotating unit driving unit which is coupled to the rotating unit to rotate the rotating unit,
   wherein the rotating unit driving unit includes:
   a rotating unit driving motor, and
   a decelerator configured to transmit torque of the rotating unit driving motor to the rotating unit.

5. The moving apparatus of claim 1, wherein:
   the moving apparatus further includes a docking unit coupled to the main body and configured to dock the moving apparatus to another moving apparatus.

6. The moving apparatus of claim 1, wherein:
   the moving means driving unit includes
   a winch configured to wind a wire, and
   a winch driving motor configured to rotate the winch, and
   wherein one end of the wire is fixed to one side of a workspace.

7. The moving apparatus of claim 6, wherein:
   the workspace is inside or outside of a hull block.

* * * * *